US005084631A

United States Patent [19]

Shiroyama

[11] Patent Number: 5,084,631

[45] Date of Patent: Jan. 28, 1992

[54] COAXIAL ENGINE STARTER

[75] Inventor: Shigeru Shiroyama, Himeji, Japan

[73] Assignee: Mitsubishi Denki K.K., Tokyo, Japan

[21] Appl. No.: 594,573

[22] Filed: Oct. 9, 1990

[30] Foreign Application Priority Data

Oct. 11, 1989 [JP] Japan .............................. 1-263038

[51] Int. Cl.[5] .................... F02N 11/00; H02K 11/00

[52] U.S. Cl. ....................................... 290/48; 74/6; 74/7 R

[58] Field of Search ............... 74/6, 7 R, 7 A; 290/48

[56] References Cited

U.S. PATENT DOCUMENTS 4,957,733 9/1990 Isozumi .............................. 290/48

FOREIGN PATENT DOCUMENTS 5752773 10/1990 Japan .

*Primary Examiner*—A. D. Pellinen
*Assistant Examiner*—Robert L. Hoover
*Attorney, Agent, or Firm*—Sughrue, Mion, Zinn, Macpeak & Seas

[57] ABSTRACT

A coaxial engine starter comprising an electric motor (1) having a hollow armature rotary shaft (2) rotatably supported by a housing (17) and an output rotary shaft (3) coaxially slidably disposed within the armature rotary shaft (2) and having a pinion (4) at a front end thereof. The motor housing has a central bore within which the armature rotary shaft (2) and the plunger rod (6a) are disposed to define an annular clearance between the housing and the plunger rod (6a). Disposed behind the motor (1) is a solenoid switch (5) having a magnetically movable iron core (6) including a plunger rod (6a) coaxially slidable relative to the armature rotary shaft (2) for operatively pushing forward the output rotary shaft (3) within said hollow armature rotary shaft (2). An oil seal ring (19) extending circumferentially around the armature rotary shaft (2) is mounted to the housing (17) between the solenoid switch (5) and the motor (1) for sealingly contacting the armature rotary shaft (2) to seal the annular clearance therearound. The seal ring also maintains the armature rotary shaft (2) in a concentric relationship with respect to the armature rotary shaft (2).

3 Claims, 2 Drawing Sheets

COAXIAL ENGINE STARTER

BACKGROUND OF THE INVENTION

This invention relates to a coaxial engine starter in which an armature rotary shaft of a d.c. motor, a rod of a solenoid switch and a starter output rotary shaft are disposed on a common axis.

FIG. 1 illustrates in a sectional front view one example of a conventional coaxial engine starter 20 which comprises a d.c. motor 1 having a hollow armature rotary shaft 2 within which an output rotary shaft 3 having a pinion 4 for engagement with an engine ring gear (not shown) is coaxially slidably inserted. Behind the d.c. motor 1, a solenoid switch 5 is disposed. The solenoid switch 5 comprises a magnetically movable iron core or plunger 6 magnetically driven by a solenoid coil 5*a*. The plunger 6 includes a plunger rod 6*a* coaxially slidable relative to the armature rotary shaft 2 for operatively engaging the output rotary shaft 3 within the cylindrical space 2*a* or a bore of the hollow armature rotary shaft 2 through a push rod 8 biased by a spring 7. The plunger rod 6*a* has mounted thereon a movable contact 10. The d.c. motor 1 comprises a substantially cup-shaped rear bracket 9 which is a part of the motor housing for supporting therein electrical brushes (not shown) of the d.c. motor 1. A pair of stationary contacts 13 for being engaged by the movable contact 10 are mounted to the rear bracket 9. A bushing 14 is disposed around the outer circumferential surface of the plunger 6 along which the plunger 6 is moved. A resin mold portion 15 and a cover 16 are also disposed.

The rear bracket 9 which is the motor housing has a hollow cylindrical portion 17 defining therein a central bore within which a sleeve bearing 18 is supported. The sleeve bearing 18 rotatably supports the outer surface of the rear end of the armature rotary shaft 2. It is seen that the front end of the plunger rod 6*a* is inserted into the rear end of the armature rotary shaft 2 and defines a substantially annular clearance between the cylindrical portion 17 and the plunger rod 6*a* as well as between the inner surface of the armature rotary shaft 2 and the plunger rod 6*a*.

When an unillustrated starter switch of a vehicle is turned on, the solenoid switch 5 is energized to move the plunger 6 forward, and this forward drive force is transmitted to the output rotary shaft 3 through the tubular plunger rod 6*a* and the intermediate push rod 8. Also, at this time, the movable contacts 10 abut against the stationary contacts 13 to connect the d.c. motor 1 to the power source (not shown), so that the rotational drive force of the armature rotary shaft 2 is transmitted to the output rotary shaft 3 through an unillustrated drive force transmission mechanism. This rotation is transmitted to the pinion 4 which is in engagement with the engine ring gear (not shown) due to the forwardly moved output rotary shaft 3, whereby the engine (not shown) is started. Further, when the power source is disconnected from the solenoid switch 5 after the engine has been started, the output rotary shaft 3 is returned to its home position by a return spring (not shown), thereby to release the engagement of the pinion 4 and the engine ring gear (not shown).

As has been described, the conventional coaxial engine starter has the hollow armature rotary shaft 2 that has the bore 2*a* of a small inner diameter because of the dimensional limitation imposed upon the bearing 18 supporting the rear end of the armature rotary shaft 2, so that there is only a small clearance between the plunger rod 6*a* and the inner surface of the armature rotary shaft 2. Therefore, when the plunger rod 6*a* tilts due to a clearance between the plunger and the bushing or the like, the front end of the plunger rod 6*a* is brought into contact with the inner surface of the rear end of the armature rotary shaft 2, generating disadvantageous wear accompanied by noise and undesirable jerky movement of the plunger rod 6*a*.

Also, wear powder generated by the sliding movement between various movable parts such as the movable contact 10, the stationary contacts 13 and the plunger 6 may enter into the annular clearance between the sleeve bearing 18 and the outer surface of the rear end of the armature rotary shaft 2 as well as between the inner surface of the armature rotary shaft 2 and the outer surface of the plunger rod 6*a*, whereby the smooth movement of the plunger rod 6*a* is impeded. Further, the lubricating greace at the sliding or rotating surfaces between the movable components may intrude into the contact portion of the movable and stationary contacts 10 and 13 of the solenoid switch 5, preventing a proper electrical connection between the movable and the stationary contacts 10 and 13.

SUMMARY OF THE INVENTION

Accordingly, an object of the present invention is to provide a coaxial engine starter free from the above-discussed disadvantages of the conventional coaxial engine starter.

Another object of the present invention is to provide a coaxial engine starter in which the plunger rod is always maintained in the proper position so that the plunger rod is prevented from contacting the inner surface of the hollow armature rotary shaft.

Another object of the present invention is to provide a coaxial engine starter in which the smooth operation of the plunger is ensured.

Another object of the present invention is to provide a coaxial engine starter in which the annular clearance between the plunger rod and the armature rotary shaft is protected from the wear powders or particles utilizing simple arrangement.

With the above objects in view, the coaxial engine starter of the present invention comprises an electric motor having a hollow armature rotary shaft rotatably supported by a housing and an output rotary shaft coaxially slidably disposed within the armature rotary shaft and having a pinion at a front end thereof. The motor housing has a central bore within which the armature rotary shaft and the plunger rod are disposed to define an annular clearance between the housing and the plunger rod. Disposed behind the motor is a solenoid switch having a magnetically movable iron core including a plunger rod coaxially slidable relative to the armature rotary shaft for operatively pushing forward the output rotary shaft within said hollow armature rotary shaft. An oil seal ring extending circumferentially around the armature rotary shaft is mounted to the housing between the solenoid switch and the motor for sealingly contacting the armature rotary shaft to seal the annular clearance therearound. The seal ring also elastically maintains the armature rotary shaft in a concentric relationship with respect to the armature rotary shaft.

BRIEF DESCRIPTION OF THE DRAWINGS

The present invention will become more readily apparent from the following detailed description of the preferred embodiment of the present invention taken in conjunction with the accompanying drawings, in which.

DESCRIPTION OF THE PREFERRED EMBODIMENT

Figure 1:
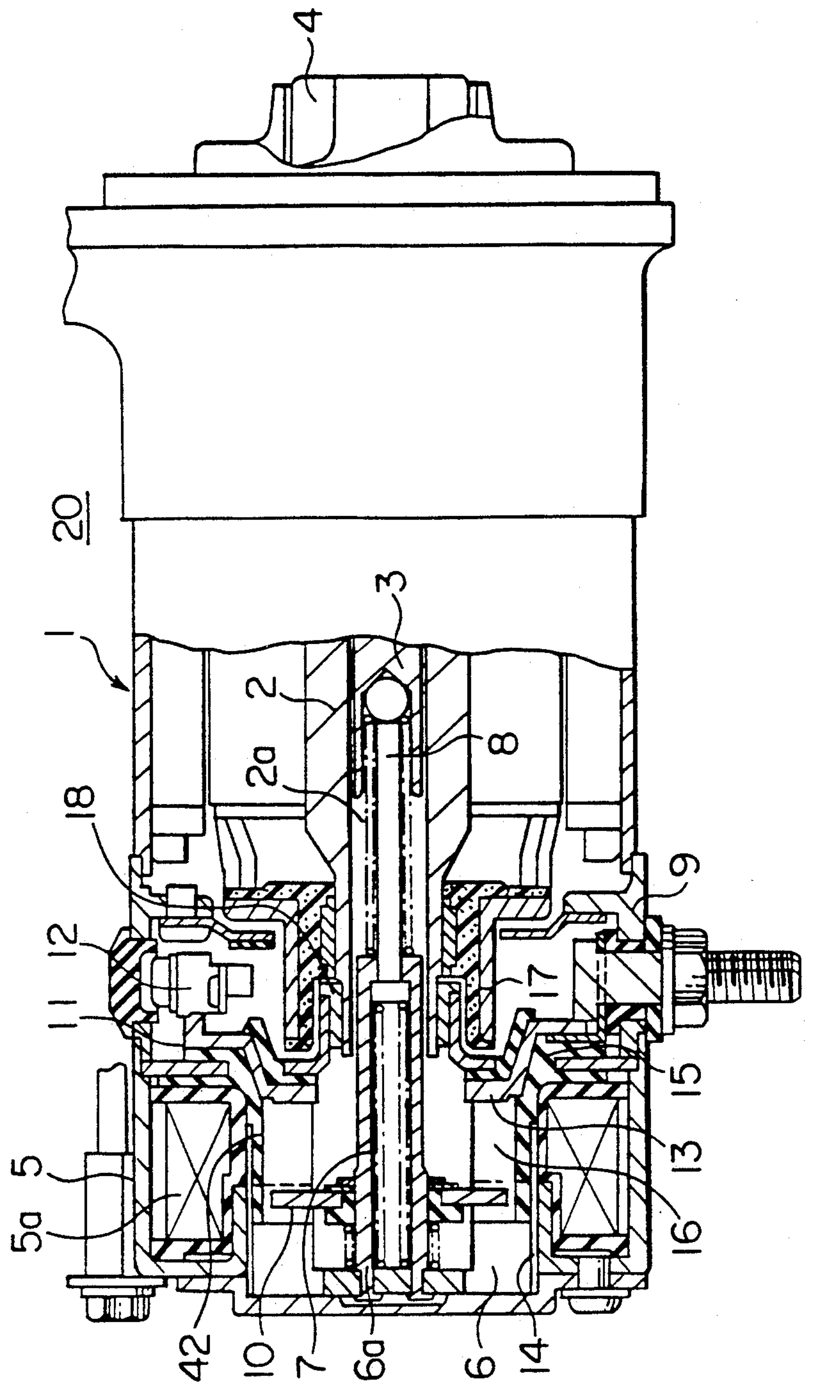
FIG. 1 PRIOR ART
FIG. 1 is partial sectional side view of a conventional coaxial engine starter.
Figure 2:
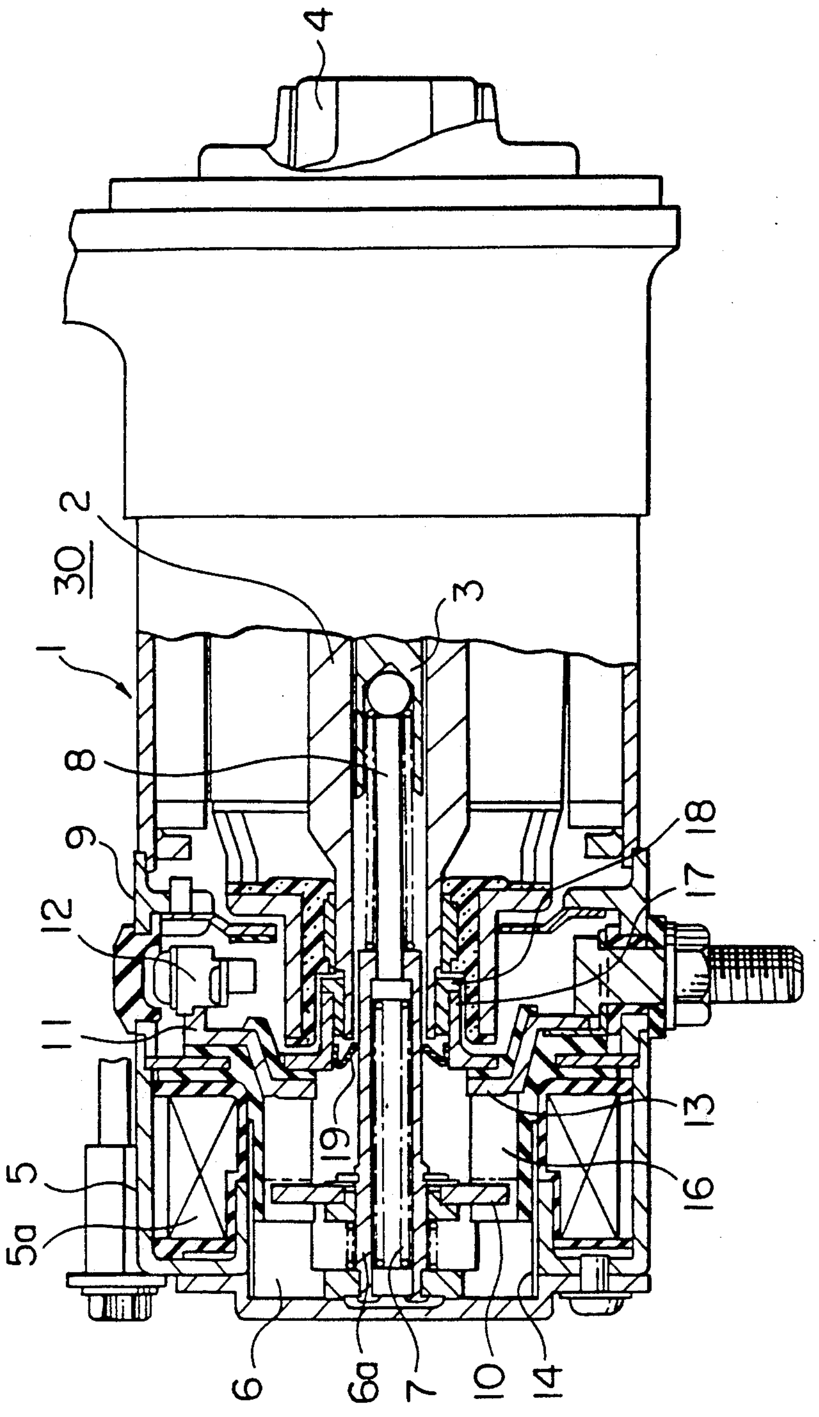
FIG. 2 is a partial sectional side view of the coaxial engine starter of the present invention.

FIG. 2 illustrates a coaxial engine starter 30 of one embodiment of the present invention, in which it is seen that the coaxial engine starter 30 has substantially the same structure as that of the conventional coaxial engine starter 20 illustrated in FIG. 1. Comparing FIG. 2 with FIG. 1, it is seen that the coaxial engine starter 30 of the present invention additionally comprises an oil seal ring 19 which is made of an elastic seal material such as rubber. The oil seal 19 is snugly elastically fitted at an outer periphery thereof to the inner surface of the cylindrical portion 17 of the rear bracket 9 behind the sleeve bearing 18, and brought into elastic contact at an inner periphery thereof with the outer surface of the plunger rod 6*a*. Thus, the elastic oil seal ring 19 elastically maintains the forward end of the plunger rod 6*a* in an axially aligned relationship with respect to the armature rotary shaft 2, thereby preventing the plunger rod 6*a* from contacting against the inner surface of the hollow armature rotary shaft 2. Also, the oil seal ring 19 seals the annular clearance defined between the inner surface of the cylindrical portion 17 of the rear bracket 9 and the outer surface of the plunger rod 6*a* as well as between inner surface of the sleeve bearing 18 and the outer surface of the plunger rod 6*a* against the passage of any foreign matters such as lubricating grease and dusts.

In other respects, the structure and the operation of the coaxial engine starter 30 of the present invention is the same as those of the conventional engine starter 20 illustrated in FIG. 1.

As has been described, according to the coaxial engine starter of the present invention, the plunger rod 6*a* is prevented from tilting due to the seal ring 19. Therefore, the front end of the plunger rod 6*a* is correspondingly prevented from contacting the inner surface of the rear end of the armature rotary shaft 2. Accordingly, disadvantageous wear, noise and undesirable jerky movement of the plunger rod 6*a* are eliminated.

Also, various wear powder generated by the sliding movement between various movable parts such as the movable contact 10, the stationary contacts 13 and the plunger 6 is prevented from entering into the annular clearance between the sleeve bearing 18 and the outer surface of the rear end of the armature rotary shaft 2 as well as between the inner surface of the armature rotary shaft 2 and the outer surface of the plunger rod 6*a*, whereby the smooth movement of the plunger rod 6*a* is ensured. Further, the lubricating grease applied at the sliding or rotating surfaces between the movable components may not intrude into the contact portion of the movable and stationary contacts 10 and 13 of the solenoid switch 5, ensuring a proper electrical connection between the movable and the stationary contacts 10 and 13.

What is claimed is:

1. A coaxial engine starter comprising:

an electric motor having a hollow armature rotary shaft rotatably supported by a housing;

an output rotary shaft coaxially slidably disposed within said armature rotary shaft and having a pinion at a front end thereof;

a solenoid switch having a magnetically movable iron core including a plunger rod coaxially slidable relative to said armature rotary shaft for operatively engaging said output rotary shaft within said hollow armature rotary shaft; and means, mounted to said housing and extending circumferentially around said plunger rod, for sealingly contacting along a continuous circumference of said plunger rod and for maintaining said plunger rod in a concentric relationship with respect to said armature rotary shaft.

2. A coaxial engine starter as claimed in claim 1, wherein said motor housing has a central bore within which said armature rotary shaft and said plunger rod are disposed to define a substantially annular clearance between the motor housing and said plunger rod, and said seal means comprises an oil seal.

3. A coaxial engine starter as claimed in claim 1, wherein said solenoid switch is disposed at the rear end of the d.c. motor, and said seal means is disposed between said solenoid switch and said d.c. motor.

* * * * *